(12) United States Patent
Fowe et al.

(10) Patent No.: US 11,474,511 B2
(45) Date of Patent: Oct. 18, 2022

(54) METHOD, APPARATUS AND COMPUTER PROGRAM PRODUCT FOR DETERMINING A MEASURE OF PROBE QUALITY

(71) Applicant: HERE GLOBAL B.V., Eindhoven (NL)

(72) Inventors: James Fowe, Chicago, IL (US); Aditya Balasaheb Jadhav, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 299 days.

(21) Appl. No.: 16/696,389

(22) Filed: Nov. 26, 2019

(65) Prior Publication Data

US 2021/0157307 A1 May 27, 2021

(51) Int. Cl.
 G05B 23/02 (2006.01)
(52) U.S. Cl.
 CPC .................. G05B 23/0232 (2013.01)
(58) Field of Classification Search
 CPC ......... G05B 23/0232; G06Q 10/06395; G06Q 50/30
 See application file for complete search history.

(56) References Cited

U.S. PATENT DOCUMENTS

| 10,060,751 | B1 * | 8/2018 | Chen | ........................ | G06F 16/29 |
| 10,393,534 | B2 * | 8/2019 | Giurgiu | ............ | G08G 1/096827 |
| 2013/0030690 | A1 * | 1/2013 | Witmer | .................. | G01C 21/32 |
| | | | | | 701/409 |
| 2015/0006069 | A1 * | 1/2015 | Kwon | .................. | G08G 1/0141 |
| | | | | | 701/119 |
| 2015/0221216 | A1 * | 8/2015 | Stenneth | ............. | G08G 1/0141 |
| | | | | | 701/117 |
| 2017/0322035 | A1 | 11/2017 | Dorum | | |
| 2018/0066957 | A1 * | 3/2018 | Stroila | ................. | G08G 1/0129 |
| 2018/0121483 | A1 * | 5/2018 | Giurgiu | .................. | G01C 21/32 |
| 2018/0276988 | A1 | 9/2018 | Littlejohn | | |
| 2018/0335307 | A1 * | 11/2018 | Chen | ....................... | G06N 20/00 |
| 2019/0103019 | A1 * | 4/2019 | Fowe | ...................... | G01S 19/42 |
| 2020/0049512 | A1 * | 2/2020 | Milici | .................... | G01C 21/32 |
| 2020/0208992 | A1 * | 7/2020 | Fowe | ...................... | G01C 21/30 |

(Continued)

OTHER PUBLICATIONS

Brouwer, J., *Measuring Real-Time Traffic Data Quality Based on Floating Car Data*, ATEC ITS France Congress (Jan. 29, 2014) 8 pages.

*Primary Examiner* — Manuel A Rivera Vargas
*Assistant Examiner* — Yaritza H Perez Bermudez
(74) *Attorney, Agent, or Firm* — Alston & Bird LLP (57) ABSTRACT

A method, apparatus and computer program product are provided to determine a measure of probe quality, such as a level of accuracy with which the location of a probe point is defined. In the context of a method and for a plurality of probe points, a distance is determined between a respective probe point and a line representative of a link. For the plurality of probe points, the method also includes determining a difference between a bearing of the respective probe point and a bearing of the link. The method further includes determining the measure of probe quality based upon a product of a representation of the distance between the plurality of probe points and the line representative of the link and a representation of the difference between the bearing of the plurality of probe points and the bearing of the link.

20 Claims, 5 Drawing Sheets

(56) References Cited

U.S. PATENT DOCUMENTS

| | | | |
|---|---|---|---|
| 2020/0309533 A1* | 10/2020 | Young | G01C 21/3415 |
| 2021/0080265 A1* | 3/2021 | Zhang | G01C 21/32 |
| 2021/0095975 A1* | 4/2021 | Mubarek | G08G 1/0129 |

* cited by examiner

METHOD, APPARATUS AND COMPUTER PROGRAM PRODUCT FOR DETERMINING A MEASURE OF PROBE QUALITY

TECHNOLOGICAL FIELD

An example embodiment relates generally to a method, apparatus and computer program product for determining a measure of probe quality.

BACKGROUND

Probe points are utilized for a variety of different applications. For example, probe points may be utilized to create and refine maps, to assess traffic patterns, to determine traffic congestion and to facilitate navigation to name but a few of the applications. Probe points may be provided by a variety of probe devices, such as a mobile device, e.g., a smartphone, a tablet computer, a personal digital assistant (PDA), a personal navigation device (PND), or the like, an in-vehicle navigation system, a vehicle control system, an advanced driver assistance system (ADAS) or the like, that provide samples of probe data regarding, for example, the location of a vehicle that carries the probe device as the vehicle proceeds along a road. In this regard, a probe point includes probe data that may include not only the location of the vehicle as may be defined by a global positioning system (GPS) sensor or other location sensor associated with the probe device and the time at which the vehicle is at the location, but also the speed, the heading, the bearing and other parameters that define the state of the vehicle that carries the probe device at the particular time. The probe data may also include an identifier, such as a trajectory identifier, that identifies the probe device that provides the probe data and enables the linking of different instances of probe data into vehicle trajectories and probe traces while still maintaining the anonymity of the probe device and/or the vehicle that the probe device is onboard. A probe trace defines the path of a probe device, such as may be carried by a vehicle during its travel along a portion of the road network.

The location of a probe device may be defined by a location sensor, for example, by a GPS sensor or a global navigation satellite system (GNSS) sensor, associated with the probe device. The accuracy with which the location is defined, however, can vary depending upon a wide variety of factors including the type of location sensor associated with the probe device. For example, probe points for which the location is defined by a GPS sensor may suffer from spatial errors of up to 20 meters in radius about the defined location.

Of the various applications that rely upon probe points, some applications are capable of utilizing probe points having a location with relatively large potential error, while other applications require or prefer the location of the probe points to be defined more accurately if these other applications are to perform in the desired fashion. For example, the level of accuracy required of the locations of probe points by an application that identifies a link-level traffic pattern is less than the level of accuracy required of the locations of probe points utilized by an application that determines real-time lane-level traffic on a highway. Similarly, the level of accuracy required of the locations of probe points by an application relating to on-street parking is greater than certain other applications, such as those that assess link-level traffic flow. As such, the variations in the level of accuracy with which the locations of probe points are defined may decrease the confidence in the output of at least some applications that rely upon the probe points, such as those applications that require greater levels of accuracy with respect to the locations of the probe points to insure proper operation.

BRIEF SUMMARY

A method, apparatus and computer program product are provided in order to determine a measure of probe quality, such as a level of accuracy with which the location of a probe point is defined. Based upon the probe quality, applications that demand a level of accuracy with respect to the locations defined by probe points that is satisfied by the resulting probe quality may utilize the probe points with increased confidence in the results of the applications and with less concern that the results of the applications are inaccurate due to the reliance upon probe points of a low quality, such as probe points for which the locations have an unsatisfactory level of accuracy. In an example embodiment, the determination of the measure of probe quality permits the probe points to be filtered based upon the probe quality such that only probe points of sufficient quality are utilized by an application. The determination of a measure of probe quality in accordance with an example embodiment also permits the source of the probe points to be evaluated in a more detailed and objective manner so as to discriminate between sources of probe points that provide probe points having greater probe quality from sources of probe points that have lesser probe quality.

In an example embodiment, a method is provided for determining a measure of probe quality. The method includes determining, for a plurality of probe points, a distance between a respective probe point and a line representative of a link, such as by determining a shortest distance between the respective probe point and the line respective of the link. For the plurality of probe points, the method also includes determining a difference between a bearing of the respective probe point and a bearing of the link. The method further includes determining the measure of probe quality based upon a product of a representation of the distance between the plurality of probe points and the line representative of the link and a representation of the difference between the bearing of the plurality of probe points and the bearing of the link.

The method of an example embodiment also includes clustering the distances between the plurality of probe points and the line representative of the link based on a number of lanes of the link. The method of this example embodiment further includes determining a probability of a probe point of the plurality of probe points being in a respective lane of the link into which the probe point was clustered. In an example embodiment, the method also includes filtering the probe points based upon the measure of probe quality. The method of an example embodiment determines the distance by designating the distance to be positive for probe points on a first side of the line representative of the link and designating the distance to be negative for probe points on a second side, opposite the first side, of the line representative of the link. In this example embodiment, the method may determine the measure of probe quality based upon an absolute value of the representation the distance between the plurality of probe points and the line representative of the link and the representation the difference between the bearing of the plurality of probe points and the bearing of the link.

In an example embodiment, the representation of the distance between the plurality of probe points and the line representative of the link includes a median of the distance between the plurality of probe points and line representative of the link. In this example embodiment, the representation of the difference between the bearing of the plurality of probe points and the bearing of the link also includes a median of the difference between the bearing of the plurality of probe points and the bearing of the link.

In another example embodiment, an apparatus is provided for determining a measure of probe quality. The apparatus includes at least one processor and at least one non-transitory memory including computer program code instructions with the computer program code instructions configured to, when executed by the at least one processor, cause the apparatus to determine, for a plurality of probe points, a distance between a respective probe point and a line representative of a link, such as by determining a shortest distance between the respective probe point and the line respective of the link. The computer program code instructions are also configured to cause the apparatus to determine, for the plurality of probe points, a difference between a bearing of the respective probe point and a bearing of the link. The computer program code instructions are further configured to cause the apparatus to determine the measure of probe quality based upon a product of a representation of the distance between the plurality of probe points and the line representative of the link and a representation of the distance between the bearing of the plurality of probe points and the bearing of the link.

The computer program code instructions are further configured to, when executed by the at least one processor, cause the apparatus of an example embodiment to cluster the distances between the plurality of probe points and the line representative of the link based on a number of lanes of the link and to determine a probability of a probe point of the plurality of probe points being in a respective lane of the link into which the probe point was clustered. In an example embodiment, the computer program code instructions are further configured to, when executed by the at least one processor, cause the apparatus to filter the probe points based upon the measure of probe quality.

The computer program code instructions configured to determine the distance include, in an example embodiment, computer program code instructions configured to designate the distance to be positive for probe points on a first side of the line representative of the link and to designate the distance to be negative for probe points on a second side, opposite the first side, of the line representative of the link. In this example embodiment, the computer program code instructions configured to determine the measure of probe quality may include computer program code instructions configured to determine the measure of probe quality based upon an absolute value of the product of the representation of the distance between the plurality of probe points and the line representative of the link and the representation of the difference between the bearing of the plurality of probe points and the bearing of the link. In an example embodiment, the representation of the distance between the plurality of probe points and the line representative of the link includes a median of the distance between the plurality of probe points and the line representative of the link. In this example embodiment, the representation of the difference between the bearing of the plurality of probe points and the bearing of the link includes a median of the difference between the bearing of the plurality of probe points and the bearing of the link.

In a further example embodiment, a computer program product is provided for determining a measure of probe quality. The computer program product includes at least one non-transitory computer-readable storage medium having computer-executable program code instructions stored therein with the computer-executable program code instructions configured to determine, for a plurality of probe points, a distance between a respective probe point and a line representative of a link, such as by determining a shortest distance between the respective probe point and the line representative of the link. For the plurality of probe points, the computer-executable program code instructions are also configured to determine the distance between a bearing of the respective probe point and a bearing of the link. The computer-executable program code instructions are further configured to determine the measure of probe quality based upon a product of a representation the distance between the plurality of probe points and the line representative of the link and a representation of the difference between the bearing of the plurality of probe points and the bearing of the link.

The computer-executable program code instructions of an example embodiment are further configured to cluster the distances between the plurality of probe points and the line representative at the link based on a number of lanes of the link. In this example embodiment, the computer-executable program code instructions are also configured to determine a probability of a probe point of the plurality of probe points being in a respective lane of the link into which the probe point was clustered. In an example embodiment, the computer-executable program code instructions are further configured to filter the probe points based on the measure of probe quality. The computer-executable program code instructions configured to determine the distance include, in an example embodiment, computer-executable program code instructions configured to designate the disk to be positive for probe points on the first side of the line representative of the link and to designate the distance to be negative for probe points on a second side, opposite the first side, of the line representative of the link. In this example embodiment, the computer-executable program code instructions configured to determine the measure of probe quality may include computer-executable program code instructions configured to determine the measure of probe quality based upon an absolute value of the product of the representation of the distance between the plurality of probe points and the line representative of the link and the representation of the difference between the bearing of the plurality of probe points and the bearing of the link.

In an example embodiment, the representation of the distance between the plurality of probe points and the line representative of the link includes a median of the distance between the plurality of probe points and the line representative of the link. In this example embodiment, the representation of the difference between the bearing of the plurality of probe points and the bearing of the link includes a median of the difference between the bearing of the plurality of probe points and the bearing of the link.

In yet another example embodiment, an apparatus is provided for determining a measure of probe quality. The apparatus includes means for determining, for a plurality of probe points, the distance between a respective probe point and a line representative of a link, such as by determining a shortest distance between the respective probe point and the line representative of the link. For the plurality of probe points, the apparatus also includes means for determining a difference between a bearing of the respective probe point and a bearing of the link. The apparatus further includes means for determining a measure of probe quality based upon a product of a representation of the distance between the plurality of probe points and the line representative of the link and a representation of the difference between the bearing of the plurality of probe points and the bearing of the link.

The apparatus of an example embodiment also includes means for clustering the distances between the plurality of probe points and the line representative of the link based on the number of lanes of the link and means for determining a probability of a probe point of the plurality of probe points being in a respective lane of the link in which the probe point was clustered. The apparatus of an example embodiment also includes means for filtering the probe points based upon the measure of probe quality. In an example embodiment, the means for determining the distance includes means for designating the distance to the positive for probe points on a first side of the line representative of the link and designating the distance to be negative for probe points on a second side, opposite the first side, of the line representative of the link. In this example embodiment, the means for determining the measure of probe quality may include means for determining the measure of probe quality based upon an absolute value of the product of the representation of the distance between the plurality of probe points and the line representative of the link and the representation of the difference between the bearing of the plurality of probe points and the bearing of the link.

In an example embodiment, the representation of the distance between the plurality of probe points and the line representative of the link includes a median of the distance between the plurality of probe points and the line representative of the link. In this example embodiment, the representation of the difference between the bearing of the plurality of probe points and the bearing of the link includes a median of the difference between the bearing of the plurality of probe points and the bearing of the link.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to determine a measure of probe quality. The measure of probe quality can be utilized for a variety of purposes as described below including, for example, in conjunction with evaluating or characterizing different sources of probe points based upon probe quality and ensuring that applications that rely upon probe points are operating based upon probe points of a sufficient probe quality to engender increased confidence in the accuracy of the results of the applications to name but a few.

Figure 1:
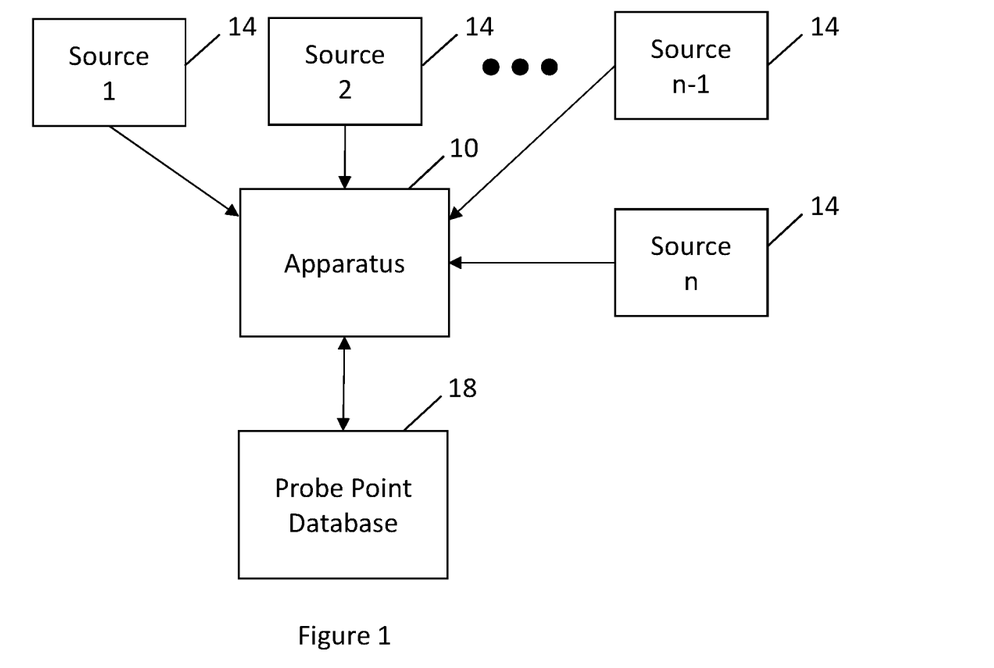
FIG. 1 illustrates a system in which probe points are provided by one or more sources and evaluated by an apparatus in accordance with an example embodiment of the present disclosure.

As shown in FIG. 1, an apparatus 10 as described below and/or a probe database 12 associated with the apparatus, such as by being in communication with the apparatus, may be configured to receive probe points from one or more sources 14 of the probe points. Regardless of the source of the probe points, probe points may be provided by a variety of probe devices, such as a mobile device, e.g., a smartphone, a tablet computer, a PDA, a PND, or the like, an in-vehicle navigation system, a vehicle control system, an ADAS or the like, that provide probe data regarding, for example, the location of a vehicle that carries the probe device as the vehicle proceeds along a road. In this regard, a probe data associated with a probe point may include not only the location of the vehicle as may be defined by a GPS sensor, a GNSS sensor or other location sensor associated with the probe device and the time at which the vehicle is at the location, but also the speed, the heading, the bearing and other parameters that define the state of the vehicle that carries the probe device at the particular time. The probe data may also include an identifier, such as a trajectory identifier, that identifies the probe device that provides the probe data and enables the linking of different instances of probe data into vehicle trajectories and probe traces while still maintaining the anonymity of the probe device and/or the vehicle that the probe device is onboard. In an instance in which the apparatus receives the probe points, the apparatus may store the probe points, either locally within memory of the apparatus or remotely, such as in the probe database. Alternatively, in an instance in which the probe database receives the probe points, the probe database may store the probe points with access to the probe points then being provided to the apparatus by the probe database.

The apparatus 10 of FIG. 1 is shown in more detail in FIG. 2 and is configured to determine the measure of probe quality as described below. The apparatus may be embodied by any of a wide variety of different computing devices including, for example, a server, a computer workstation, a personal computer, a desktop computer or any of a wide variety of mobile computing devices. Regardless of the type of computing device that embodies the apparatus, the apparatus of an example embodiment includes, is associated with or is in communication with processing circuitry 22, memory 24 and communication interface 26.

In some embodiments, the processing circuitry 22 (and/or co-processors or any other processors assisting or otherwise associated with the processing circuitry) may be in communication with the memory device 24 via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processing circuitry.

The processing circuitry 22 may be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment of the present invention while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor of a specific device (for example, a computing device) configured to employ an embodiment of the present invention by further configuration of the processor by instructions for performing the algorithms and/or operations described herein. The processing circuitry may include, among other things, a clock, an arithmetic logic unit (ALU) and logic gates configured to support operation of the processing circuitry.

The apparatus 10 of an example embodiment may also optionally include a communication interface 26 that may be any means such as a device or circuitry embodied in either hardware or a combination of hardware and software that is configured to receive and/or transmit data from/to other electronic devices in communication with the apparatus, such as one or more sources of probe data 14 or the probe database 12. Additionally or alternatively, the communication interface may be configured to communicate in accordance with various wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

Figure 2:
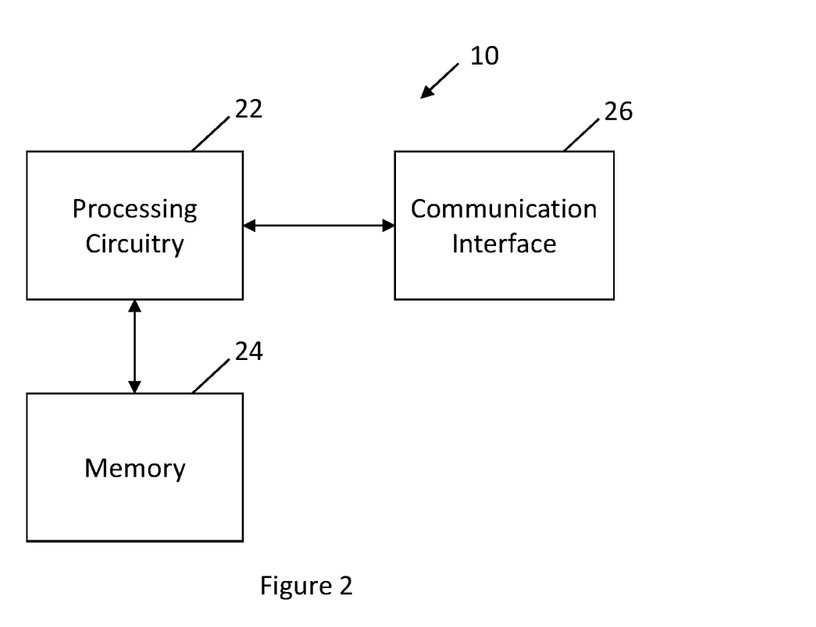
FIG. 2 is a block diagram of an apparatus that may be specifically configured in accordance with an example embodiment of the present disclosure to determine a measure of probe quality.
Figure 3:
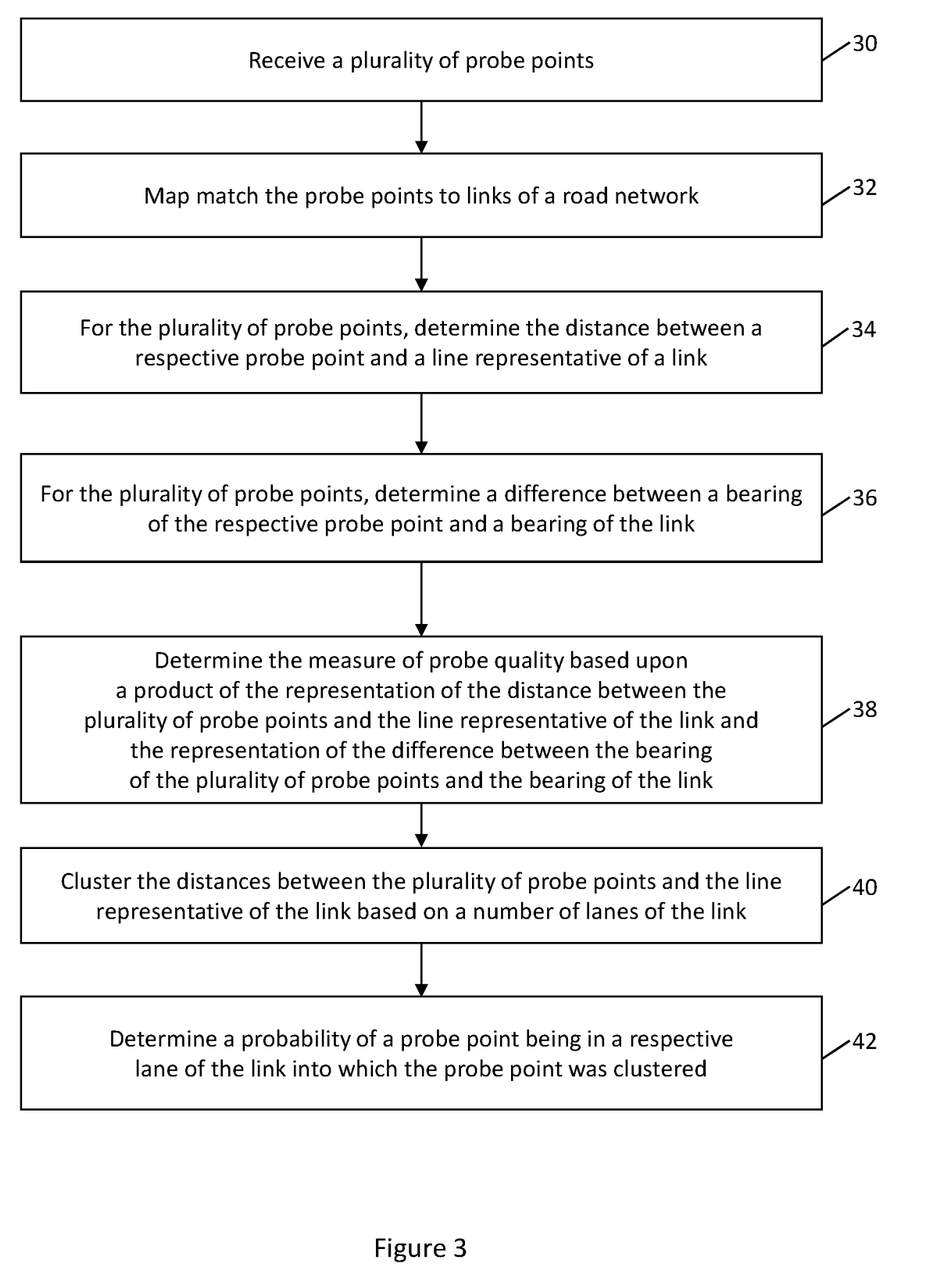
FIG. 3 is a block diagram illustrating operations performed, such as by the apparatus of FIG. 2, in accordance with the example embodiment of the present disclosure.

Referring now to FIG. 3, the operations performed by the apparatus 10 of FIG. 2 in order to determine a measure of probe quality are depicted. The apparatus of this example embodiment includes means, such as the processing circuitry 22, the communication interface 26 or the like, configured to receive the plurality of probe points. See block 30. The apparatus, such as the processing circuitry, may be configured to receive the plurality of probe points from a source 14 of probe points via the communication interface, or the apparatus, such as the processing circuitry, may be configured to retrieve the plurality of probe points from n probe database 12 or some other external repository that has stored the plurality of probe points, such as the plurality of probe points provided by one or more sources of probe points.

As shown in block 32 of FIG. 3, the apparatus 10 also includes means, such as the processing circuitry 22 or the like, configured to map match respective probe points of the plurality of probe points to a link of a road network. In this regard, the road network comprised of a plurality of links may be defined by map data stored by the memory 24 or a database accessible by the processing circuitry, such as via the communications interface 26. In this regard, the map data may define each of a plurality of links and provide information associated with the links, such as the function class of a link, whether a stop light or stop sign is associated with the link, the length of the link, and any intersection with which the link is associated.

In an example embodiment, the map data may include the information necessary to define a map of the roads and other features, at least in a certain region. In this regard, the map data may include various attributes of the road segments, such as represented by the links. The map data may also be representative of sidewalks or other types of pedestrian segments, as well as open areas, such as grassy regions or plazas.

The map data of an example embodiment may include node data, road segment data or link data, point of interest (POI) data or the like in addition to traffic data as described below. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map data may contain path segment and node data records or other data that may represent bicycle lanes, pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map data can include data about the POIs and their respective locations in the POI records. The map data may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

By map matching a probe point to a corresponding link, the apparatus 10, such as the processing circuitry 22, associates the probe point with the corresponding link based upon the location of the probe point and indicates that the probe point was captured during transit along the corresponding link. After having map matched the probe points to corresponding links, the apparatus of an example embodiment includes means, such as the processing circuitry or the like, configured to determine, for the plurality of probe points, a distance between a respective probe point and a line representative of the link to which the respective probe point has been map matched. See block 34 of FIG. 3. Although the link may be represented by different types of lines, the link of an example embodiment is represented by a center line that extends longitudinally along the link and is located laterally at the center of the link. The apparatus, such as the processing circuitry, may determine the distance between a respective probe point and the line representative of the link to which the respective probe point has been map matched in various manners. In an example embodiment, however, the apparatus, such as the processing circuitry, is configured to determine the distance between a respective probe point and the line representative of the link with which the probe point has been map matched by determining the shortest distance between the respective probe point and the line representative of the link with which the respective probe point has been map matched, such as a distance along a line that extends in a perpendicular direction from the center line of the link to the respective probe point.

Figure 4:
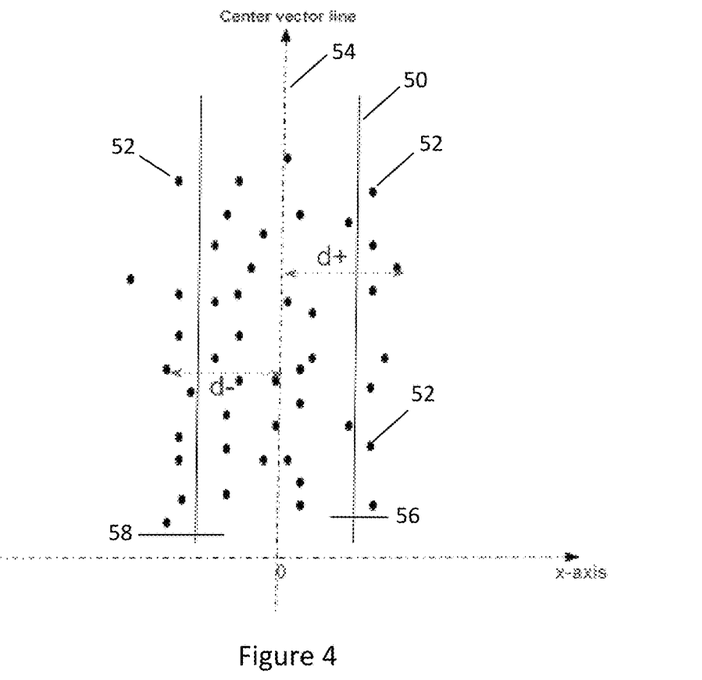
FIG. 4 is a graphical representation of a plurality of probe points relative to a line representative of a link from which distances therebetween may be determined in accordance with an example embodiment of the present disclosure.

By way of example, FIG. 4 depicts a link 50 of a road network and a plurality of probe points 52 that have been map matched to the link. The probe points are depicted to be at positions relative to the link that correspond with to the locations associated with the probe points. Additionally, the center line 54 of the link is depicted with some of the probe points being located on a first side 56 of the line representative of the link and other probe points located on the second side 58, opposite the first side, of the line representative of the link. By way of example of the distance between a probe point and a line representative of the link to which the probe point has been map matched, the distance d from two different probe points on opposite sides of the line representative of the link to the line representative of the link are depicted. As shown, the distance d that is determined by the apparatus 10, such as the processing circuitry 22, is the shortest distance from the respective probe point to the line representative of the link to which the probe point has been map matched. As this example embodiment in which the line representative of the link extends linearly also illustrates, the distance is determined in a direction perpendicular to the line representative of the link to the respective probe point.

The apparatus 10, such as the processing circuitry 22, of this example embodiment is configured to assign a different sign, e.g., positive or negative, to the distance depending upon the side of the line representative of the link on which a probe point is located. In the example of FIG. 4, the apparatus includes means, such as the processing circuitry or the like, configured to designate the distance to be positive for probe points on a first side of the line representative of the link, e.g., on the right side of the line representative of the link of FIG. 4 as indicated by d+, and means, such as the processing circuitry or the like, configured to designate the distance to be negative for probe points on the second side, opposite the first side, of the line representative of the link, e.g., on the left side of the line representative of the link of FIG. 4 as indicated by d−.

Figure 5:
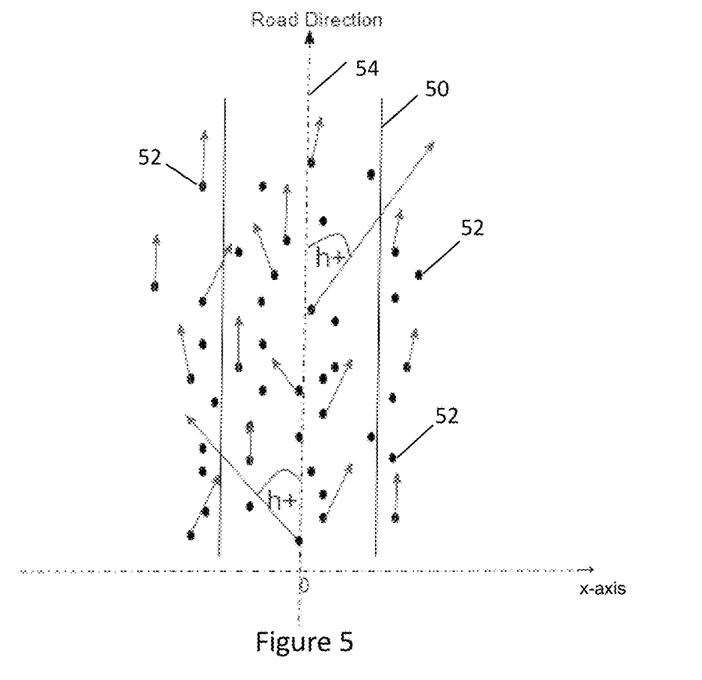
FIG. 5 is a graphical representation of the bearing of a plurality of probe points from which a difference between the bearing of the plurality of probe points and the bearing of the line representative of the link may be determined in accordance with an example embodiment of the present disclosure.

In addition to determining the distance between probe points and a line representative of a link with which the probe points have been map matched, the apparatus 10, such as the processing circuitry 22, also determines the difference between the bearing of the probe points and the bearing of the link. As such, the apparatus additionally includes means, such as the processing circuitry or the like, configured to determine, for the plurality of probe points, the difference between a bearing of a respective probe point and the bearing of the link with which the probe point has been map matched. See block 36 of FIG. 3. Referring now to FIG. 5, the link 50 and the associated center line 54 as well as a plurality of probe points 52 that have been map matched to the link, such as the probe points described above in conjunction with FIG. 4, are depicted in conjunction with a representation of the bearing 56 of many of the probe points in the form of directional lines extending from the probe points at angles representative of the bearings. In addition to the bearing of the probe points, the link also includes a bearing, such as the bearing of the center line as may be defined by the map data. In an example embodiment, the difference between the bearing of a respective probe point and the bearing of the link will be a positive value between 0 degrees and 180 degrees, regardless of whether the angle extends in a clockwise or counterclockwise direction.

Based upon the distance between respective probe points and the line representative of a link to which the probe points have been map matched and the difference between the bearings of the respective probe points and the bearing of the link with which the probe points have been map matched, the apparatus 10 of an example embodiment is configured to determine the measure of probe quality. In this regard, the apparatus includes means, such as the processing circuitry 22 or the like, configured to determine the measure of probe quality based upon a product of: (i) a representation the distance between the plurality of probe points and the line representative of a link with which the probe points have been map matched and (ii) a representation of the difference between the bearing of the plurality of probe points and the bearing of the link with which the probe points have been map matched. See block 38 of FIG. 3.

The distance between the plurality of probe points and the line representative of the link with which the probe points have been map matched may be represented in various manners, but, in an example embodiment, the representation of the distance is the median of the distance between the plurality of probe points and the line representative of the link with which the probe points have been map matched. As such, the apparatus 10 of this example embodiment includes means, such as the processing circuitry 22 or the like, configured to determine the median of the distance between the plurality of probe points and the line representative of the link with which the probe points have been map matched.

The difference between the bearing of the plurality of probe points and the bearing of the link with which the probe points have been map matched may also be represented in various manners. In an example embodiment, however, the representation of the difference between the bearing of the plurality of probe points and the bearing of the link with which the probe points have been map matched is the median of the difference between the bearing of the plurality probe points and the bearing of the link with which the probe points have been map matched. Thus, the apparatus 10 of this example embodiment also includes means, such as the processing circuitry 22 or the like, configured to determine the median of the difference between the bearing of the plurality probe points and the bearing of the link with which the probe points have been map matched.

As a result, the apparatus 10, such as the processing circuitry 22, of this example embodiment that relies upon the median values is configured to determine the measure of probe quality based upon the product of: (i) the median of the distance between the plurality of probe points and the line representative of the link with which the probe points have been map matched and (ii) the median of the difference between the bearing of the plurality probe points and the bearing of the link with which the probe points have been map matched.

In an example embodiment, the distance between a respective probe point and the line representative of the link with which the probe point has been map matched may be either positive or negative depending upon the side of the line upon which the probe point is located. As such, the apparatus 10, such as the processing circuitry 22, of this example embodiment is configured to determine the measure of probe quality to be based upon the absolute value of the product of: (i) the representation of the distance between the plurality of probe points and the line representative of the link with which the probe points have been map matched and (ii) the representation of the difference between the bearing of the plurality of probe points and the bearing of the link with which the probe points have been map matched. By way of example, the measure of probe quality (PQM) may be defined as:

$$PQM = |\text{median}(d\text{-value}) * \text{median}(h\text{-value})|$$

wherein d-value is the representation of the distance between the plurality of probe points and the line representative of the link with which the probe points have been map matched is and – value is the representation of the difference between the bearing of the plurality of probe points and the bearing of the link with which the probe points have been map matched.

The product that is determined serves as a representation of the measure of probe quality. In this regard, larger values represent probe points having a lower probe quality as a result of larger distances between the probe points and the line representative of the link with which the probe points have been map matched and/or larger differences between the bearing of the plurality of probe points and the bearing of the link with which the probe points have been map matched. Conversely, smaller values represent probe points having a greater probe quality as a result of shorter distances between the probe points and the line representative of the link with which the probe points have been map matched and/or smaller differences in the bearing of the probe points relative to the bearing of the link with which the probe points have been map matched.

The measure of probe quality may be utilized in various manners. For example, in instances in which probe points are provided by a plurality of different sources 14, the apparatus 10, such as the processing circuitry 22, may be configured to separately determine the measure of probe quality for the probe points that were provided by each of the different sources. As such, the value provided by the different sources of probe points may be at least partially assessed in an objective manner based upon the probe quality. This assessment may be utilized for various purposes including as a factor in the differential compensation of the sources of probe points depending upon the probe quality of the probe points provided by the different sources and/or to foster interaction with a probe source that has provided lower probe quality probe points in an effort to increase the probe quality of the probe points provided by the source in the future. Similarly, the apparatus, such as the processing circuitry, may be configured to separately determine the measure of probe quality for different sets of probe points, such as probe points associated with different times of the day, different days of the week, different types of locations, e.g., urban versus rural, probe points associated with different probe trajectories or the like.

By way of another example and based upon the measure of probe quality, the apparatus 10, such as the processing circuitry 22, can ensure that one or more applications that utilize probe points are provided with probe points of sufficient quality such that the accuracy of and the confidence in the results of the application(s) are increased. In this example embodiment, the apparatus may include means, such as the processing circuitry or the like, configured to filter the probe points based upon the measure of probe quality. In an instance in which an application requires probe points of at least a predefined probe quality in order to provide a reliable and accurate result, the apparatus, such as the processing circuitry, is configured to filter the probe points such that only those probe points having a measure of probe quality that satisfy the predefined probe quality demanded by the application are provided to the application with the other probe points that fail to satisfy the predefined probe quality of the application being discarded or otherwise not provided to the application. Different applications may have different requirements as to the quality, e.g., different predefined probe qualities, of the probe points that are utilized by the respective applications. For example, applications associated with on-street parking or lane-level traffic analysis may demand probe points of greater probe quality than applications that relate to link-level traffic analysis. Thus, the apparatus, such as the processing circuitry, may be configured to provide different groups of probe points to the different applications with the probe points provided to a respective application satisfying the predefined probe quality demanded by the respective application.

In an example embodiment, the link with which one or more probe points are map matched may include a plurality of lanes, such as two, three or more lanes, in one or more directions. In this example embodiment, the apparatus 10, such as the processing circuitry 22, may be configured to determine a confidence metric associated with the probability of a probe point being associated with a respective lane of a link, such as by being properly map matched to the respective lane of the link. In order to determine the probability of a respective probe point being associated with a particular lane, the distance between the respective probe point and the line representative of the link with which the probe point is map matched is determined as described above including, in one embodiment, the designation the distance to be positive for every probe point on a first side of the line representative of the link and negative for a probe point on a second side, opposite the first side, of the line representative of the link.

Figure 6:
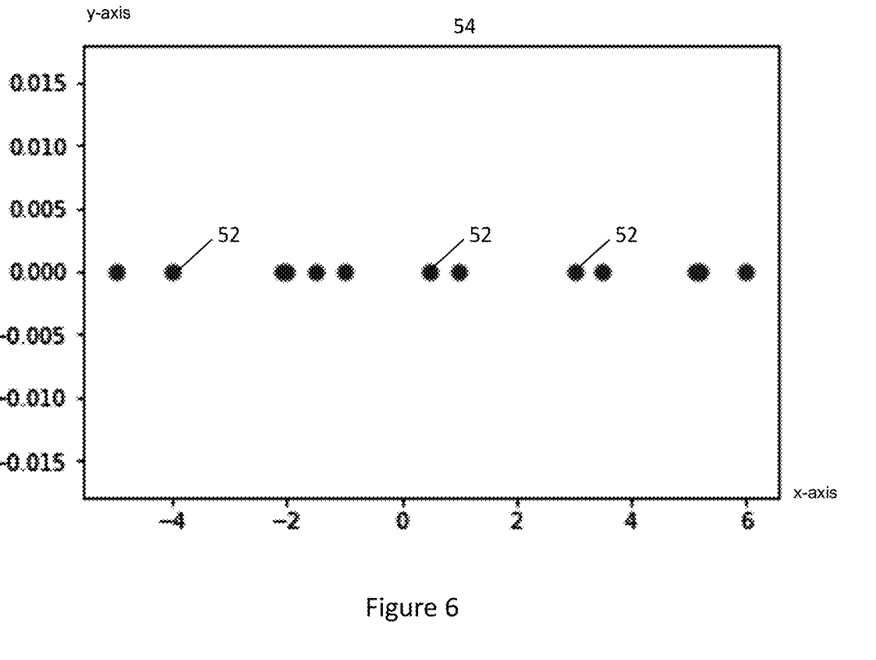
FIG. 6 is a graphical representation of the locations of probe points in a lateral direction across a link.
Figure 7:
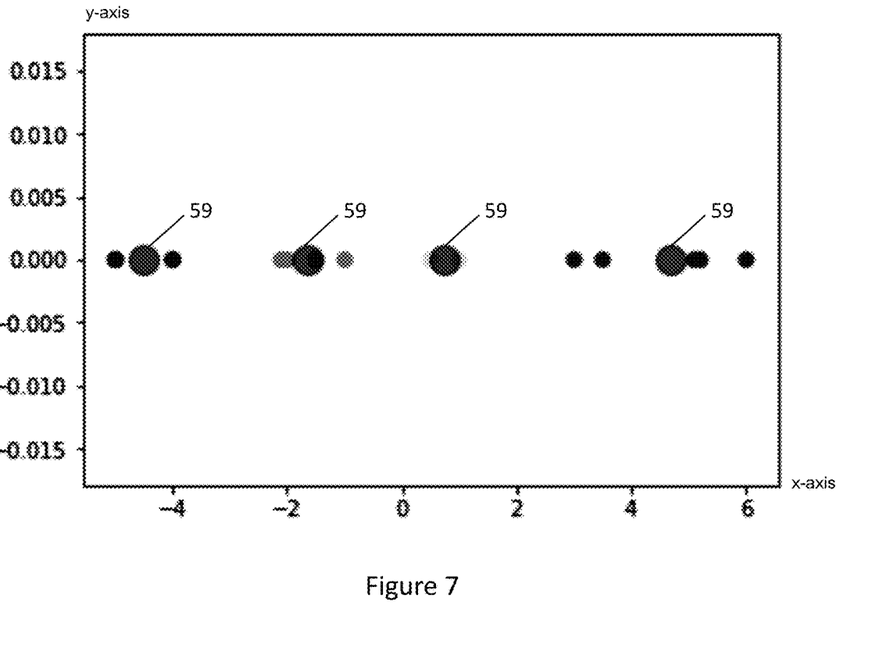
FIG. 7 is a graphical representation of the clustering of the probe points of FIG. 6 based upon a number of lanes of the link in accordance to an example embodiment of the present disclosure.

Based upon the distances between the probe points and the line representative of the link with which the probe points have been map matched, the probe points may then be clustered, such as into a number of clusters equal to the number of lanes of the link. As shown in FIG. 6, for example, the probe points that have been map matched to a link are graphically represented as a scalar projection based upon the lateral location of the probe points across the link as defined by the distance between the probe points and the line representative of the link. In this example embodiment, the apparatus 10 includes means, such as the processing circuitry 22 or the like, for clustering the plurality of probe points map matched to a link based upon the number of lanes of the link and based upon the lateral locations of the probe points relative to the link, such as may be defined by the distances between the plurality of probe points and the line representative of the link to which the probe points have been map matched. In this regard, the apparatus, such as the processing circuitry, may be configured to cluster the probe points into a number of clusters equal to the number of lanes of the link. As a result of the clustering, a probe point is determined to be associated with, e.g., map matched to, the lane corresponding to the cluster that includes the probe point. As shown in FIG. 7, for example, the plurality of probe points of FIG. 6 have been clustered into four clusters corresponding to the four lanes of the link. The probe points may be clustered in various manners, such as by k-means clustering in which k is the number of lanes of the link.

In this example embodiment, the apparatus 10 also includes means, such as the processing circuitry 22 or the like, configured to determine the probability a respective probe point is associated with, that is, actually lies within, the lane of the link into which the probe point was clustered. The apparatus, such as the processing circuitry, may be configured to determine the probability in various manners, but, in an example embodiment, the apparatus includes means, such as the processing circuitry or the like, configured to determine the probability using a probability distribution function. In the following discussion, a gaussian distribution function is employed as the probability distribution function by way of example and not of limitation. Indeed, other types of probability distribution functions may be employed in other example embodiments. In this regard, the apparatus, such as the processing circuitry, is configured to determinate a gaussian distribution function for each of the clusters of probe points. The gaussian distribution function for a respective cluster is defined based upon the mean and the standard deviation of the distances between the probe points that comprise a cluster and the line representative of the link to which the probe points have been map matched.

The apparatus 10 of this example embodiment, such as the processing circuitry 22, is configured to determine the probability of a respective probe point being associated with a respective lane of the link based upon an evaluation of the distance between the respective probe point and the line representative of the link relative to the gaussian distribution function associated with the cluster of probe points for the respective lane of the link. This evaluation may be repeated for the gaussian distribution function associated with the cluster of probe points for each different lane of the link in order to determine the probability of the probe point being associated with each of the different lanes of the link. See, for example, FIG. 8 which depicts a probe point $P_1$ having a location that lies within Lane $L_1$ of a three lane road and the probabilities of the probe point being associated with each of the three different lanes. In this example, the probe point $P_1$ that was included in the cluster associated with Lane $L_1$ of the link has of a probability of 70% of actually being associated with Lane $L_1$ and other probabilities, such as lower probabilities of 28% and 2%, of actually being associated with Lanes $L_2$ and $L_3$ of the link.

Figure 8:
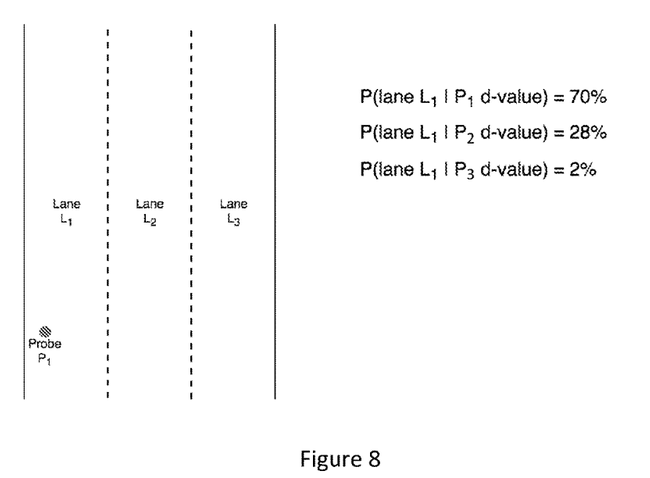
FIG. 8 is a graphical representation of a link having three lanes with a probe point indicated to most likely be associated with a first lane of the link in accordance with an example embodiment of the present disclosure.

The probability of a probe point serves as a confidence metric relative to the lane-level map matching. In this regard, the probability with which a probe point is associated with a respective lane may be proportional to the confidence with which the association is established such that higher values of probability leads to greater confidence in the lane level map matching and lower probabilities leads to lesser confidence in the lane level map matching. In some embodiments, the apparatus 10, such as the processing circuitry 22, is configured to determine the confidence metric for a plurality of probe points, such as the probe points provided by source 14 of probe points. In this embodiment, the apparatus, such as the processing circuitry, may be configured to determine a representation, such as the mean, of the probabilities of the probe points actually being associated with the lane corresponding to the cluster that contains the respective probe point.

Figure 9:
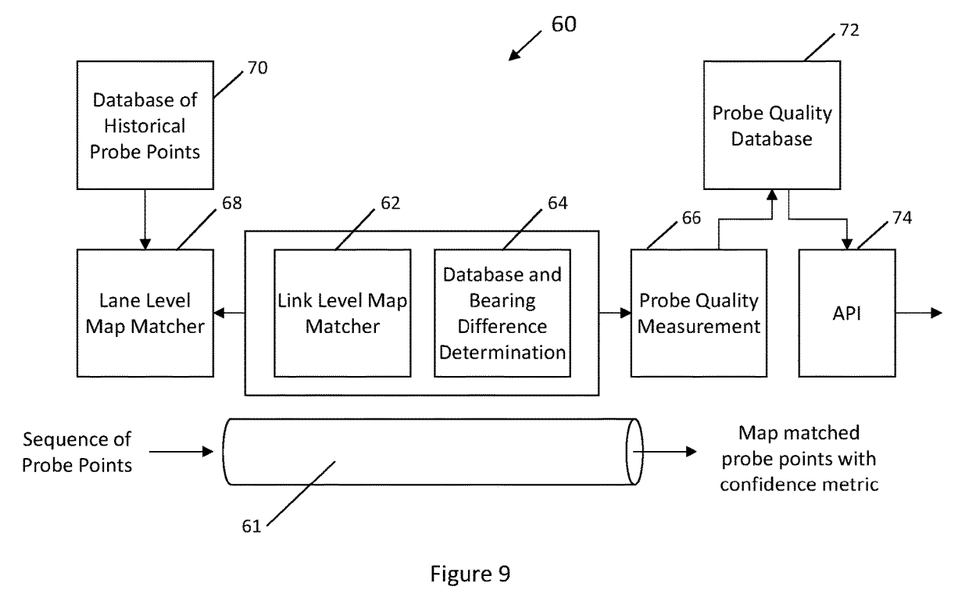
FIG. 9 is a block diagram of a system configured to determine a measure of probe quality and to determine a confidence metric associated with lane level map matching in accordance with an example embodiment of the present disclosure.

The apparatus 10 for determining the measure of probe quality and/or for determining a confidence metric for lane level map matching may be incorporated into any of a wide variety of systems. By way of example, but not of limitation, FIG. 9 depicts a system 60 including such an apparatus in which a plurality of probe points are received, such as via a data processing pipeline 61, and are processed, such as on the fly in real-time or near real-time. Alternatively, the system of other example embodiments may operate offline. The system of the illustrated embodiment includes a link level map matcher 62 configured to map match the plurality of probe points to respective links. The system and, more particularly, the apparatus also includes the means, such as the processing circuitry 22, configured to evaluate the plurality of probe points to determine a distance between a respective probe point and a line representative of the link with which the probe point has been map matched and also to determine the difference between the bearing of the respective probe point and the bearing of the link with which the probe point has been map matched as indicated by the block 64 designated Distance and Bearing Difference Determination. For each of a plurality of probe points, the information regarding the link with which the probe point has been map matched and the distance between the respective probe point and the line representative of the link and the difference between the bearing of the respective probe point and the bearing of the link may be provided to the apparatus for determination of a measure of probe quality as described above and as shown by block 66 designated Probe Quality Measurement as well as for lane-level map matching and the determination of a lane-level map-matching confidence metric as shown by block 68 designated Lane Level Map Matcher.

In relation to the lane-level map-matching, the information regarding a respective probe point, such as the link with which the probe point has been associated and the distance between the respective probe point and a line representative of the link and the difference between of the bearing of the respective probe point and the bearing of the link, is provided to the lane-level map-matcher 68. The lane-level map-matcher is then configured to determine the probability of the probe point being associated with the various lanes of the link, thereby also defining the confidence metric. In order to define the probability, the lane-level map-matcher of this example embodiment also has access to a database 70 of historical probe points associated with the link to which a respective probe point was map matched from which clusters of the historical probe points may be defined in association with the plurality of lanes of the link and gaussian distribution functions may, in turn be defined for the different clusters of probe points. By evaluating the distance between the respective probe point and the line representative of the link relative to the gaussian distribution functions of the locations of the probe points that comprise the different clusters of probe points associated with the different lanes of the link, the apparatus 10, such as the processing circuitry 22, is configured to determine the probability of association of the respective probe point with each of the different lanes of the link. For example, the apparatus, such as the processing circuitry, may be configured to implement a hidden Markov model and to determine the probability of association of the respective probe point with each of the different lanes of the link based upon the emission probabilities associated with the different lanes. In this example, the emission probability associated with a lane is directly related, such as by being directly proportional, to the probability that the respective probe point is associated with the lane, e.g., a larger emission probability indicates a greater probability that the respective probe point is associated with the lane while a smaller emission probability indicates a lower probability that the respective probe point is associated with the lane (or at least less certainty that the respective probe point is associated with the lane). Although the database may be a database of historical probe points from which the apparatus may determine the gaussian distribution functions, the database of an example embodiment may alternatively or additionally provide the gaussian distribution functions associated with the different clusters of historical probe points associated with a link to facilitate more efficient determination of the probabilities of the respective probe point being associated with the different lanes of the link.

In the system of FIG. 9, the measure of probe quality may be stored, such as in a probe quality database 72, and may be provided, such as via an application programming interface 74, to one or more customers or other recipients. As described above, these customers may utilize the measure of probe quality in various manners including the evaluation of different sources 14 of probe points, ensuring the reliance on probe points of sufficient probe quality for at least some applications that demand higher levels of probe quality or the like. Along with the measure of probe quality, a plurality of map-matched probe points, such as probe points associated with a respective link are provided. In some embodiments, the results of the lane-level map-matching along with probability values associated with the different lanes of the link in order to provide a confidence metric with respect to the lane-level map-matching. As a result, recipients of the map-match probe points may utilize the probe points with more confidence and with a more complete understanding as to the quality of the probe points and the confidence with which the probe points have been map-matched on a lane level.

FIG. 3 illustrates a flowchart depicting a method according to an example embodiment of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus 20 employing an embodiment of the present invention and executed by the processing circuitry 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for determining a measure of probe quality, the method comprising:
   for a plurality of probe points, determining a distance between a respective probe point and a line representative of a link;
   for the plurality of the probe points, determining a difference between a bearing of the respective probe point and a bearing of the link;
   determining the measure of probe quality based upon a product of a representation of the distance between the plurality of probe points and the line representative of the link and a representation of the difference between the bearing of the plurality of probe points and the bearing of the link; and
   providing probe points to an application based upon the measure of probe quality of the probe points such that the probe points that are provided satisfy a predefined probe quality of the application.

2. A method according to claim 1 further comprising:
   clustering the distances between the plurality of probe points and the line representative of the link based on a number of lanes of the link; and
   determining a probability of a probe point of the plurality of probe points being in a respective lane of the link into which the probe point was clustered.

3. A method according to claim 1 further comprising filtering the probe points based upon the measure of probe quality.

4. A method according to claim 1 wherein determining the distance comprises determining a shortest distance between the respective probe point and the line representative of the link.

5. A method according to claim 1 wherein determining the distance comprises designating the distance to be positive for probe points on a first side of the line representative of the link and designating the distance to be negative for probe points on a second side, opposite the first side, of the line representative of the link.

6. A method according to claim 5 wherein determining the measure of probe quality comprises determining the measure of probe quality based upon an absolute value of the product of the representation of the distance between the plurality of probe points and the line representative of the link and the representation of the difference between the bearing of the plurality of probe points and the bearing of the link.

7. A method according to claim 1 wherein the representation of the distance between the plurality of probe points and the line representative of the link comprises a median of the distance between the plurality of probe points and the line representative of the link, wherein the representation of the difference between the bearing of the plurality of probe points and the bearing of the link comprises a median of the difference between the bearing of the plurality of probe points and the bearing of the link.

8. An apparatus for determining a measure of probe quality, the apparatus comprising at least one processor and at least one non-transitory memory including computer program code instructions, the computer program code instructions configured to, when executed by the at least one processor, cause the apparatus to:
   for a plurality of probe points, determine a distance between a respective probe point and a line representative of a link;
   for the plurality of the probe points, determine a difference between a bearing of the respective probe point and a bearing of the link;
   determine the measure of probe quality based upon a product of a representation of the distance between the plurality of probe points and the line representative of the link and a representation of the difference between the bearing of the plurality of probe points and the bearing of the link; and
   provide probe points to an application based upon the measure of probe quality of the probe points such that the probe points that are provided satisfy a predefined probe quality of the application.

9. An apparatus according to claim 8 wherein the computer program code instructions are further configured to, when executed by the at least one processor, cause the apparatus to:
   cluster the distances between the plurality of probe points and the line representative of the link based on a number of lanes of the link; and
   determine a probability of a probe point of the plurality of probe points being in a respective lane of the link into which the probe point was clustered.

10. An apparatus according to claim 8 wherein the computer program code instructions are further configured to, when executed by the at least one processor, cause the apparatus to filter the probe points based upon the measure of probe quality.

11. An apparatus according to claim 8 wherein the computer program code instructions configured to determine the distance comprise computer program code instructions configured to determine a shortest distance between the respective probe point and the line representative of the link.

12. An apparatus according to claim 8 wherein the computer program code instructions configured to determine the distance comprise computer program code instructions configured to designate the distance to be positive for probe points on a first side of the line representative of the link and designate the distance to be negative for probe points on a second side, opposite the first side, of the line representative of the link.

13. An apparatus according to claim 12 wherein the computer program code instructions configured to determine the measure of probe quality comprise computer program code instructions configured to determine the measure of probe quality based upon an absolute value of the product of the representation of the distance between the plurality of probe points and the line representative of the link and the representation of the difference between the bearing of the plurality of probe points and the bearing of the link.

14. An apparatus according to claim 8 wherein the representation of the distance between the plurality of probe points and the line representative of the link comprises a median of the distance between the plurality of probe points and the line representative of the link, wherein the representation of the difference between the bearing of the plurality of probe points and the bearing of the link comprises a median of the difference between the bearing of the plurality of probe points and the bearing of the link.

15. A computer program product for determining a measure of probe quality, the computer program product comprising at least one non-transitory computer-readable storage medium having computer-executable program code instructions stored therein, the computer-executable program code instructions configured to:

for a plurality of probe points, determine a distance between a respective probe point and a line representative of a link;

for the plurality of the probe points, determine a difference between a bearing of the respective probe point and a bearing of the link;

determine the measure of probe quality based upon a product of a representation of the distance between the plurality of probe points and the line representative of the link and a representation of the difference between the bearing of the plurality of probe points and the bearing of the link; and provide probe points to an application based upon the measure of probe quality of the probe points such that the probe points that are provided satisfy a predefined probe quality of the application.

16. A computer program product according to claim 15 wherein the computer-executable program code instructions are further configured to:

cluster the distances between the plurality of probe points and the line representative of the link based on a number of lanes of the link; and determine a probability of a probe point of the plurality of probe points being in a respective lane of the link into which the probe point was clustered.

17. A computer program product according to claim 15 wherein the computer-executable program code instructions are further configured to filter the probe points based upon the measure of probe quality.

18. A computer program product according to claim 15 wherein the computer-executable program code instructions configured to determine the distance comprise computer-executable program code instructions configured to designate the distance to be positive for probe points on a first side of the line representative of the link and designate the distance to be negative for probe points on a second side, opposite the first side, of the line representative of the link.

19. A computer program product according to claim 18 wherein the computer-executable program code instructions configured to determine the measure of probe quality comprise computer-executable program code instructions configured to determine the measure of probe quality based upon an absolute value of the product of the representation of the distance between the plurality of probe points and the line representative of the link and the representation of the difference between the bearing of the plurality of probe points and the bearing of the link.

20. A computer program product according to claim 15 wherein the representation of the distance between the plurality of probe points and the line representative of the link comprises a median of the distance between the plurality of probe points and the line representative of the link, wherein the representation of the difference between the bearing of the plurality of probe points and the bearing of the link comprises a median of the difference between the bearing of the plurality of probe points and the bearing of the link.

* * * * *